United States Patent [19]

Casamassima

[11] Patent Number: 5,620,726
[45] Date of Patent: Apr. 15, 1997

[54] PROCESS FOR COLORING OLIVES

[76] Inventor: Pietro Casamassima, Via A. Moro, 129, Cerignola (Foggia) 71042, Italy

[21] Appl. No.: 561,132

[22] Filed: Nov. 20, 1995

[30] Foreign Application Priority Data

Nov. 25, 1994 [IT] Italy ............................. B094A0526 U

[51] Int. Cl.⁶ ..................................................... A23L 1/275
[52] U.S. Cl. .......................... 426/254; 426/257; 426/262; 426/269
[58] Field of Search ..................................... 426/262, 269, 426/254, 257

Primary Examiner—Helen Pratt
Attorney, Agent, or Firm—Darby & Darby

[57] ABSTRACT

A process for coloring olives, using an aqueous erythrosine solution as the colorant.

10 Claims, No Drawings

PROCESS FOR COLORING OLIVES

BACKGROUND OF THE INVENTION

The present invention relates to a process for coloring olives, in particular using an aqueous erythrosine solution.

It is known that erythrosine (3',6'-dihydroxy-2',4',5',7'-tetraiodospiro(isobenzofuran-1(3H),9'-(9H)xanthene)-3-one sodium salt) can be used to color foodstuffs and pharmaceuticals without harmful effects (Colour Index vol. 4 (edition 3, 1971), page 4428). It is a brown powder which dissolves in water producing a cherry-red solution. However, in the foodstuffs coloring sector, it has been noticed that certain parameters and conditions must be respected to prevent the finished product having a patchy appearance, that is to say, an uneven color, or to prevent it losing its color after a brief period of time, or during storage or when rubbed, for example, with a cotton pad soaked in water.

It has been noticed that if olives are colored using erythrosine, by simply immersing them in a solution of variable concentration, the treated olives have a patchy "leopard skin" appearance, that is to say, they are both red (due to the erythrosine) and green (due to the natural chlorophyll) or the color of the olives treated.

SUMMARY OF THE INVENTION

The aim of the present invention is to find an improved process which allows the even coloring of olives using erythrosine, without producing unwanted patches, and in which the color remains persistently enclosed in the product structure, from which it cannot be removed even by repeated rubbing and after lengthy periods of time.

The preset aim is achieved with surprising success if the olives, before being colored with an erythrosine solution, are subjected to a special treatment which prepares the olive pulp for a uniform, resistant coloring.

The aim of the present invention is, therefore, a process for coloring olives characterized in that, before immersing the olives in the erythrosine solution, they are subjected to a bleaching process using sulfurous anhydride or a citric acid solution then, after washing to remove all traces of the said sulfurous anhydride or a citric acid solution, the olives are immersed in a boiling aqueous erythrosine solution, then retrieved, washed to remove all traces of the colorant and packaged.

DESCRIPTION OF THE PREFERRED EMBODIMENTS

In the process relative to the present invention the olives used are already de-bittered (using, for example, caustic soda) and semi-processed in brine following lactic fermentation, desalted in running water or in containers until the desired salt content (0–2%) is obtained. The olives used as the starting material must have an even coloring and be free of cuts and/or bruising. Uniformity of size and ripeness is also desirable, as is the highest possible percentage of pulp and the highest pulp—pip ratio. These requirements are not essential to the detriment of the coloring, but favor a final product with a pleasant appearance, appreciated by the consumer.

Following desalting, the olives are subjected to a pre-treatment with sulfurous anhydride or alkaline sulfites or the bleaches normally used in the foodstuffs industry, until a sulfurous anhydride content of approximately 300 mg/Kg is obtained relative to the weight of the drupes. A higher concentration would require an excessively lengthy treatment in water for the subsequent stage intended to remove the sulfurous anhydride or the bleach used. This treatment allows a very pale product to be obtained, ready for the subsequent coloring.

Alternatively, the untreated olives may be subjected to a brief treatment (5–10 minutes) with an aqueous citric acid solution, in which the acid concentration varies between 0.2 and 0.4% and the temperature is preferably between 40° and 60° C. The weight ratio between the aqueous citric acid solution and the olives must not be less than 3:1, and is preferably 5:1. The same treatment may be effected at room temperature, although the period of treatment in this case is much longer: 24–48 hours.

After cooling in running water to remove excess citric acid and drip-drying, the pH of the olives is measured, and must be between 3.8 and 5.1. The optimum pH value is 4.0–4.7, in particular 4.2. Should the pH value be higher or lower than that mentioned above, an acid or, respectively, a suitable base, must be added. Once the desired, suitable pH value has been obtained, and it becomes evident that the value remains constant, without further variations, the olives are ready for the coloring process, and so are immersed in a boiling aqueous erythrosine solution in accordance with the following specifications:

erythrosine concentration: 0.04–0.2%, preferably 0.05–0.1%;

temperature: 40°–75° C., preferably 45°–70° C.;

treatment time: 20–50 minutes at boiling point, 25–35 minutes recommended;

weight ratio between erythrosine solution and olives: 4–6:0.5–2, preferably 4.5–5:1–1.5.

After cooling and rapid washing in water, any color which is not fixed to the drupes must be removed by means of a further treatment in running water for 10–15 minutes. Washing in running water is intended to separate out any olives whose pericarp is excessively cracked by the various mechanical and chemical actions to which they are subjected during the process.

The glass containers are then filled with olives, which are covered with the very hot pickle (from 70° to 90° C, preferably 80° C.). The pickle may be a 2–5% salt solution, preferably 3%, or a 15–25% sugar solution, preferably 20%, with added natural flavoring.

The containers are sealed and the product is pasteurized by immersing the containers in boiling water for a period of time which generally ranges from 25 to 40 minutes, from the moment in which the water begins to boil.

At the end of this time, the containers are removed from the boiling water and immersed in a tub containing water at a temperature of 40°–45° C. The tub is cooled, avoiding direct contact between the containers and cold water, then the containers are packaged, labeled and wrapped.

Tests carried out on olives colored using this method, involving observation of the pickle and repeated rubbing of the olives for short and long periods (15–6 months) have not revealed the presence of patches or any loss of color. The olives treated with sulfurous anhydride remain tomato-red, whilst those treated with citric acid remain strawberry-red, the color being perfectly even and having an attractive appearance.

The following example further illustrates the invention, without limiting it.

EXAMPLE

Following desalting to obtain a 2% salt content, 200 g of green olives are treated for 5 minutes and at 50° C. with an aqueous citric acid solution with 0.07% concentration. The weight ratio between the citric acid solution and the olives is 4.5:1.

After cooling in running water to remove excess citric acid, the pH of the olives is measured as 4.2. The olives are then immersed in 1 liter of a boiling aqueous erythrosine solution in accordance with the following specifications: erythrosine concentration 0.08%; treatment time 30 minutes; weight ratio between the erythrosine and the olives 5:1.

The olives are then repeatedly washed with water, so as to cool them and remove the final traces of colorant which is not fixed, then they are transferred to glass containers which are filled with a pickle (brine). The containers are immersed in a tub of boiling water for 30 minutes. The containers are removed from the boiling water and immersed in a tub of water at 40°–45° C.. After 20 minutes the containers are removed from the water, dried and left to stand for 15 days. At this point, they are opened and the olives are examined. They have an even, bright red color, which cannot be removed, even by vigorous rubbing with a cloth or a cotton pad soaked in water.

The same results are obtained if the olives are treated with sulfurous anhydride or sulfites instead of a citric acid solution.

What is claimed:

1. A process for coloring olives, using an aqueous erythrosine solution as the colorant, comprising:

a. desalting the olives in water until the salt content is between 0 and 2%;

b. immersing the olives in an aqueous citric acid solution;

c. eliminating the excess citric acid by washing and drip-drying until the olive pH value is between 4.0 and 4.7;

d. immersing the olives in an aqueous erythrosine solution for a period of time between 20 and 50 minutes at a temperature of 40°–75° C., the weight ratio between the erythrosine solution and the olives being 4–6:0.5–2;

e. cooling and washing to remove traces of unfixed colorant;

f. inserting the olives in glass containers which are then immersed in boiling water for 25–30 minutes, after which they are immersed in water at 40°–45° C., cooled and packaged.

2. The process of claim 1, wherein the treatment in stage b) is effected using sulfurous anhydride, sulfites, or another of the bleaches normally used in the foodstuffs sector, instead of citric acid.

3. The process of claim 1, wherein the treatment with citric acid solution lasts for 5 minutes, at a temperature between 40° and 60° C., the ratio between the citric acid solution and the olives being greater than 3:1, where the citric acid solution concentration is between 0.2 and 0.4%.

4. The process of claim 3 wherein the ratio between the citric acid solution and the olives is 5:1.

5. The process of claim 1, wherein the temperature in stage d) is between 45° and 70° C., the period during which the olives remain in the erythrosine solution varying between 25 and 35 minutes, and the ratio between the erythrosine solution and the olives ranges from between 4–6:0.5–2 and 4.5–5:1–1.5.

6. The process of claim 1, wherein the pH of the olives before immersion in the erythrosine solution ranges from 3.8 to 5.1.

7. The process of claim 6 wherein the pH of the olives before immersion in the erythrosine solution ranges from 4.0 to 4.7.

8. The process of claim 1, wherein the erythrosine concentration in stage d) varies between 0.04% and 0.2%.

9. The process of claim 8 wherein the erythrosine concentration in stage d) ranges from 0.05% to 0.1%.

10. The process of claim 1, wherein in combination with stage a) the olives are de-bittered using caustic soda.

* * * * *

UNITED STATES PATENT AND TRADEMARK OFFICE
CERTIFICATE OF CORRECTION

PATENT NO.   :   5,620,726
DATED        :   April 15, 1997
INVENTOR(S)  :   Pietro CASAMASSIMA It is certified that error appears in the above-indentified patent and that said Letters Patent is hereby corrected as shown below:

On the title page: Item [30]    Foreign Application Priority Data, change "B094A0526 U" to --B094A0526--.

Signed and Sealed this

Sixteenth Day of September, 1997

Attest:

BRUCE LEHMAN

Attesting Officer

Commissioner of Patents and Trademarks